US009642013B2

(12) United States Patent
Shaulov et al.

(10) Patent No.: US 9,642,013 B2
(45) Date of Patent: May 2, 2017

(54) MOBILE COMMUNICATOR NETWORK ROUTING DECISION SYSTEM AND METHOD

(71) Applicant: CHECK POINT MOBILE SECURITY LTD., Tel Aviv (IL)

(72) Inventors: Michael Shaulov, Haifa (IL); Ohad Bobrov, Kochav Yair (IL)

(73) Assignee: CHECK POINT MOBILE SECURITY LTD, Tel Aviv (IL)

( * ) Notice: Subject to any disclaimer, the term of this patent is extended or adjusted under 35 U.S.C. 154(b) by 222 days.

(21) Appl. No.: 14/055,275

(22) Filed: Oct. 16, 2013

(65) Prior Publication Data
US 2015/0106921 A1 Apr. 16, 2015

(51) Int. Cl.
G06F 11/00 (2006.01)
G06F 12/14 (2006.01)
H04W 12/12 (2009.01)
H04L 29/06 (2006.01)
G06F 21/57 (2013.01)

(52) U.S. Cl.
CPC .......... *H04W 12/12* (2013.01); *G06F 21/577* (2013.01); *H04L 63/1416* (2013.01); *H04L 63/1425* (2013.01); *H04L 63/1433* (2013.01)

(58) Field of Classification Search
None
See application file for complete search history.

(56) References Cited

U.S. PATENT DOCUMENTS

| 8,255,517 | B1* | 8/2012 | Hernacki et al. ............. 709/224 |
| 8,566,932 | B1* | 10/2013 | Hotta ...................... G06F 11/00 726/2 |
| 8,621,559 | B2* | 12/2013 | Alperovitch et al. ............ 726/1 |
| 2006/0120526 | A1* | 6/2006 | Boucher et al. .............. 380/247 |
| 2008/0086776 | A1* | 4/2008 | Tuvell et al. ................... 726/24 |
| 2013/0097710 | A1* | 4/2013 | Basavapatna et al. ......... 726/25 |
| 2013/0167231 | A1* | 6/2013 | Raman et al. .................. 726/23 |

* cited by examiner

*Primary Examiner* — Fatoumata Traore
(74) *Attorney, Agent, or Firm* — Mark M. Friedman

(57) ABSTRACT

A mobile communicator network routing decision system communicating with each mobile communicator device of a plurality of mobile communicator devices, the plurality of mobile communicator devices communicating with a network via at least one computerized network gateway server, the system including security risk calculation functionality operable for calculating a calculated malware-associated risk associated with each mobile communicator device, and security risk responsive decision functionality, operating in response to the calculated malware-associated risk, for ascertaining whether to allow the communicating of each mobile communicator device with the network via the computerized network gateway server.

55 Claims, 2 Drawing Sheets

US 9,642,013 B2

MOBILE COMMUNICATOR NETWORK ROUTING DECISION SYSTEM AND METHOD

FIELD OF THE INVENTION

The present invention relates generally to network routing decision systems and methods in general, and in particular to network routing decision systems and methods relating to secure communication of mobile communicator devices on a network such as the internet.

BACKGROUND OF THE INVENTION

As use of personal mobile communicator devices by enterprise employees becomes ubiquitous, there arises a need to monitor communication of these devices to ensure that the security thereof has not been compromised by malware residing on the device.

SUMMARY OF THE INVENTION

The present invention seeks to provide network routing decision systems and methods for mobile communicator devices.

There is thus provided in accordance with a preferred embodiment of the present invention a mobile communicator network routing decision system communicating with each mobile communicator device of a plurality of mobile communicator devices, the plurality of mobile communicator devices communicating with a network via at least one computerized network gateway server, the system including security risk calculation functionality operable for calculating a calculated malware-associated risk associated with each mobile communicator device, and security risk responsive decision functionality, operating in response to the calculated malware-associated risk, for ascertaining whether to allow the communicating of each mobile communicator device with the network via the computerized network gateway server.

Preferably, the network is the internet. Preferably, the network gateway server is a GGSN gateway server. Alternatively, the network gateway server is a Wi-Fi access point.

Preferably, the system resides on a cloud server, the cloud server residing in the internet. Alternatively, the system resides on at least one of the mobile communicator devices.

Preferably, calculating of a calculated malware-associated risk associated with a mobile communicator device, includes analyzing characteristics and behavior patterns of the mobile communicator device and communication patterns generated by the mobile communicator device. Preferably, analyzing characteristics and behavior patterns of the mobile communicator device and communication patterns generated by the mobile communicator device comprise employing a plurality of rules which define known malware-associated behavior. Preferably, the rules are periodically remotely updated on the system via the internet.

Additionally, the calculated malware-associated risk associated with the mobile communicator device corresponds to a likelihood of at least some of the characteristics, the behavior patterns and the communication patterns of the mobile communicator device being associated with malware. Preferably, the likelihood of the at least some of the characteristics, the behavior patterns and the communication patterns being associated with malware varies between different ones of the mobile communicator devices.

Preferably, the security risk responsive decision functionality is also operable for comparing the calculated malware-associated risk to a predetermined risk threshold, and is also operable, responsive to the comparing, to allow direct communicating of the mobile communicator device with the network via the computerized network gateway server when the calculated malware-associated risk is lower than the predetermined risk threshold, and to disallow direct communicating of the mobile communicator device with the network via the computerized network gateway server when the calculated malware-associated risk is higher than the predetermined risk threshold. Additionally, the security risk calculation functionality is operative to continuously calculate the calculated malware-associated risk associated the mobile communicator device. Yet additionally, when the security risk responsive decision functionality disallows direct communicating of the mobile communicator device with the network via the computerized network gateway server responsive to a first calculated malware-associated risk which is higher than the predetermined risk threshold, the security risk calculation functionality is then subsequently operable to calculate a second malware-associated calculated risk which is lower than the predetermined risk threshold, and responsive thereto, the security risk responsive decision functionality is operable to reallow direct communicating of the mobile communicator device with the network via the computerized network gateway server.

Preferably, analyzing the characteristics, the behavior patterns and the communication patterns of the mobile communicator device includes comparing at least one of:

events generated by an operating system of the mobile communicator device;

network communication events generated by the mobile communicator device;

network communication events generated by an application installed on the mobile communicator device;

binary code of applications installed on the mobile communicator device;

version identifiers of applications installed on the mobile communicator device;

a version identifier of an operating system of the mobile communicator device;

devices, documents and media files which are accessed on the mobile communicator device;

a role of an owner of the mobile communicator device within an enterprise;

a location and a roaming state of the mobile communicator device;

a current type and state of a connection of the mobile communicator device to a wireless network;

files stored on at least one of a file system of the mobile communicator device and an external storage device connected to the mobile communicator device;

a list of processes running on the mobile communicator device and characteristics associated therewith;

security settings of the mobile communicator device;

debug settings of the mobile communicator device;

application metadata of applications installed on the mobile communicator device;

application certificates of applications installed on the mobile communicator device;

network settings of the mobile communicator device; and software related parameters of the mobile communicator device to corresponding behaviors and settings known to the system as being associated with malware.

Preferably, the current type and state of a connection of the mobile communicator device to a wireless network includes at least one of secure/unsecure Wi-Fi, 3G and LTE. Preferably, the security settings of the mobile communicator device include at least a setting which allows installation of third-party applications and security certificates on the mobile communicator device. Preferably, the debug settings of the mobile communicator include at least a directive to operate the mobile communicator device in a debug mode. Preferably, the software related parameters of the mobile communicator device include at least one of a build property and a driver parameter. Preferably, the network settings of the mobile communicator device include at least network parameters, the network parameters including at least one of TCP and Wi-Fi related parameters.

Preferably, allowing direct communicating of the mobile communicator device with the network via the computerized network gateway server includes instructing the mobile communicator device to route network traffic to the network via the computerized network gateway server. Preferably, disallowing direct communicating of the mobile communicator device with the network via the computerized network gateway server includes instructing the mobile communicator device to cease routing network traffic to the network via the computerized network gateway server.

Preferably, disallowing direct communicating of the mobile communicator device with the network via the computerized network gateway server includes instructing the mobile communicator device to route network traffic to the network via a security enforcement server by employing at least one of a VPN connection, a proxy connection, and an APN connection. Alternatively, disallowing direct communicating of the mobile communicator device with the network via the computerized network gateway server includes instructing the mobile communicator device to switch to an alternative vLAN of the network gateway server and only thereafter to route network traffic via the computerized network gateway server. Alternatively, disallowing direct communicating of the mobile communicator device with the network via the computerized network gateway server includes modifying routing tables of the mobile communicator device and only thereafter allowing the mobile communicator device to route network traffic via the computerized network gateway server.

Preferably, ascertaining whether to allow the communicating of the mobile communicator device with the network via the computerized network gateway server includes ascertaining whether to allow a subset of the communicating of the mobile communicator device with the network via the computerized network gateway. Preferably, the subset of the communicating of the mobile communicator device with the network via the computerized network gateway includes at least one of communication of the mobile communicator device to particular domains or IP addresses which are associated with malware, communications of the mobile communicator originating from particular applications installed on the mobile communicator device, all communications originating from the mobile communicator device except for communications with particular IP addresses or domains, and specific types of application data communicated by the mobile communicator device.

There is also provided in accordance with another preferred embodiment of the present invention a mobile communicator network routing decision method including calculating a calculated malware-associated risk associated with a mobile communicator device and, responsive to the calculated malware-associated risk, ascertaining whether to allow communicating of the mobile communicator device with a network via a computerized network gateway server.

Preferably, the network is the internet. Preferably, the network gateway server is a GGSN gateway server. Alternatively, the network gateway server is a Wi-Fi access point.

Preferably, calculating of a calculated malware-associated risk associated with a mobile communicator device includes analyzing characteristics and behavior patterns of the mobile communicator device and communication patterns generated by the mobile communicator device. Preferably, analyzing characteristics and behavior patterns of the mobile communicator device and communication patterns generated by the mobile communicator device comprise employing a plurality of rules which define known malware-associated behavior. Preferably, the rules are periodically remotely updated via the internet.

Additionally, the calculated malware-associated risk associated with the mobile communicator device corresponds to a likelihood of at least some of the characteristics, the behavior patterns and the communication patterns of the mobile communicator device being associated with malware. Preferably, the likelihood of the at least some of the characteristics, the behavior patterns and the communication patterns being associated with malware varies between different ones of the mobile communicator devices.

Preferably, the method also includes comparing the calculated malware-associated risk to a predetermined risk threshold, and responsive to the comparing, allowing direct communicating of the mobile communicator device with the network via the computerized network gateway server when the calculated malware-associated risk is lower than the predetermined risk threshold, and disallowing direct communicating of the mobile communicator device with the network via the computerized network gateway server when the calculated malware-associated risk is higher than the predetermined risk threshold. Additionally, the method also includes continuously calculating the calculated malware-associated risk associated the mobile communicator device. Yet additionally, the method also includes, responsive to initially disallowing direct communicating of the mobile communicator device with the network via the computerized network gateway server responsive to calculating a first calculated malware-associated risk which is higher than the predetermined risk threshold and then subsequently calculating a second calculated malware-associated risk which is lower than the predetermined risk threshold, reallowing direct communicating of the mobile communicator device with the network via the computerized network gateway server.

Preferably, analyzing the characteristics, the behavior patterns and the communication patterns of the mobile communicator device includes comparing at least one of:

events generated by an operating system of the mobile communicator device;

network communication events generated by the mobile communicator device;

network communication events generated by an application installed on the mobile communicator device;

binary code of applications installed on the mobile communicator device;

version identifiers of applications installed on the mobile communicator device;

a version identifier of an operating system of the mobile communicator device;

devices, documents and media files which are accessed on the mobile communicator device;

a role of an owner of the mobile communicator device within an enterprise;

a location and a roaming state of the mobile communicator device;

a current type and state of a connection of the mobile communicator device to a wireless network;

files stored on at least one of a file system of the mobile communicator device and an external storage device connected to the mobile communicator device;

a list of processes running on the mobile communicator device and characteristics associated therewith;

security settings of the mobile communicator device;

debug settings of the mobile communicator device;

application metadata of applications installed on the mobile communicator device;

application certificates of applications installed on the mobile communicator device;

network settings of the mobile communicator device; and software related parameters of the mobile communicator device to corresponding behaviors and settings known to be associated with malware.

Preferably, the current type and state of a connection of the mobile communicator device to a wireless network includes at least one of secure/unsecure Wi-Fi, 3G and LTE. Preferably, the security settings of the mobile communicator device include at least a setting which allows installation of third-party applications and security certificates on the mobile communicator device. Preferably, the debug settings of the mobile communicator include at least a directive to operate the mobile communicator device in a debug mode. Preferably, the software related parameters of the mobile communicator device include at least one of a build property and a driver parameter. Preferably, the network settings of the mobile communicator device include at least network parameters, the network parameters including at least one of TCP and Wi-Fi related parameters.

Preferably, allowing the direct communicating of the mobile communicator device with the network via the computerized network gateway server includes instructing the mobile communicator device to route network traffic to the network via the computerized network gateway server. Preferably, disallowing direct communicating of the mobile communicator device with the network via the computerized network gateway server includes instructing the mobile communicator device to cease routing network traffic to the network via the computerized network gateway server.

Preferably, disallowing the direct communicating of the mobile communicator device with the network via the computerized network gateway server includes instructing the mobile communicator device to route network traffic to the network via a security enforcement server by employing at least one of a VPN connection, a proxy connection, and an APN connection. Alternatively, disallowing direct communicating of the mobile communicator device with the network via the computerized network gateway server includes instructing the mobile communicator device to switch to an alternative vLAN of the network gateway server and only thereafter to route network traffic via the computerized network gateway server. Alternatively, disallowing direct communicating of the mobile communicator device with the network via the computerized network gateway server includes modifying routing tables of the mobile communicator device and only thereafter allowing the mobile communicator device to route network traffic via the computerized network gateway server.

Preferably, ascertaining whether to allow the communicating of the mobile communicator device with the network via the computerized network gateway server includes ascertaining whether to allow a subset of the communicating of the mobile communicator device with the network via the computerized network gateway. Preferably, the subset of the communicating of the mobile communicator device with the network via the computerized network gateway includes at least one of communication of the mobile communicator device to particular domains or IP addresses which are associated with malware, communications of the mobile communicator originating from particular applications installed on the mobile communicator device, all communications originating from the mobile communicator device except for communications with particular IP addresses or domains, and specific types of application data communicated by the mobile communicator device.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 1:
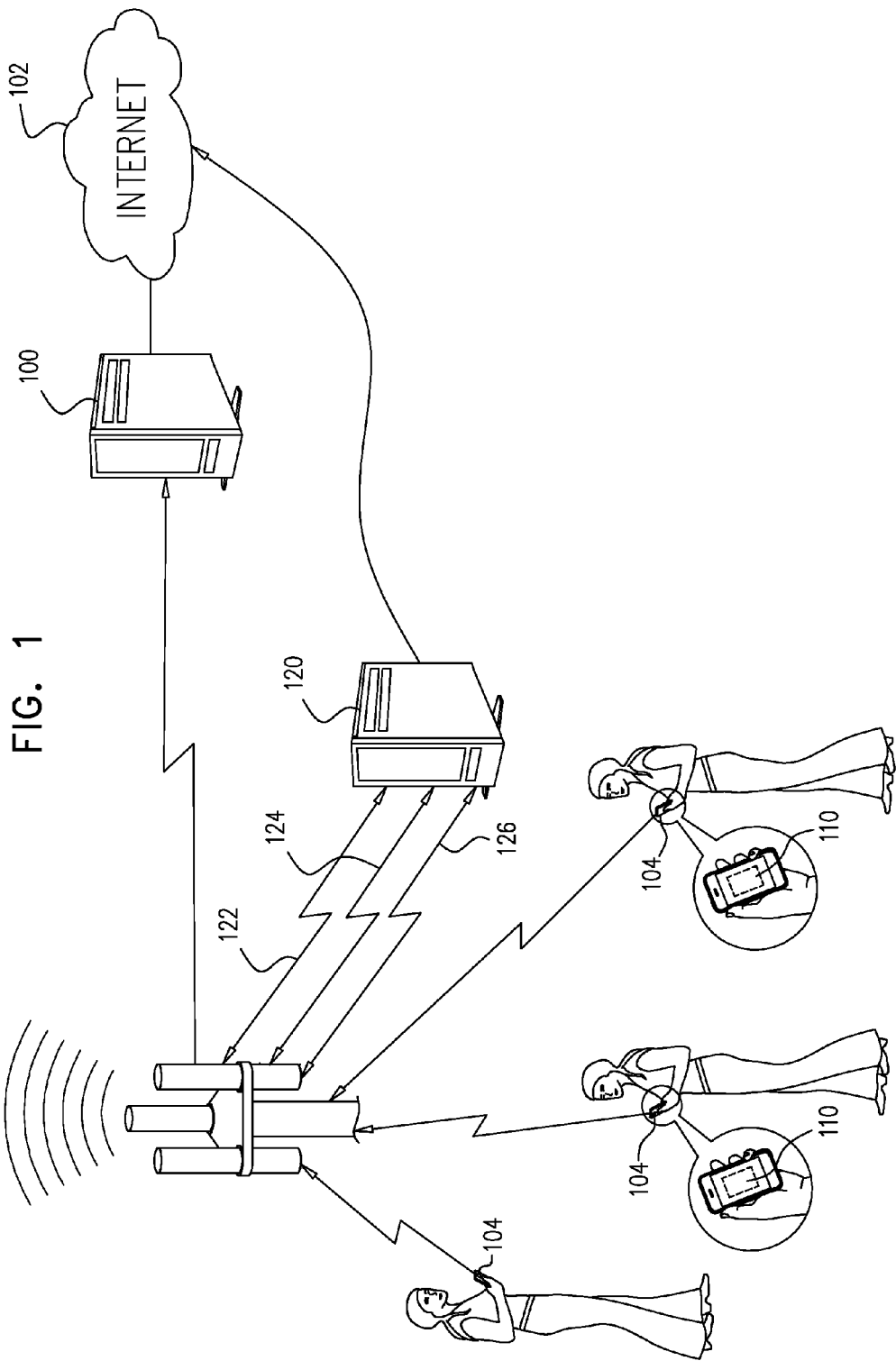
FIG. 1 is a simplified pictorial illustration of an example of the operation of a mobile communicator network routing decision system, constructed and operative in accordance with a preferred embodiment of the present invention.

Reference is now made to FIG. 1, which is a simplified pictorial illustration of an example of the operation of a mobile communicator network routing decision system, constructed and operative in accordance with a preferred embodiment of the present invention. As shown in FIG. 1, the mobile communicator network routing decision system is suitable for operating in a mobile communicator network which includes a computerized network gateway server 100 operable for providing computerized access to a network 102 such as, for example, the internet. It is appreciated that network gateway server 100 may be, for example, a GGSN gateway server or a Wi-Fi access point.

The mobile communicator network of FIG. 1 also preferably includes a plurality of mobile communicator devices 104 operable for communicating with network 102 via computerized network gateway server 100. Some of mobile communicator devices 104 may be owned or used by employees of an enterprise, in which case a network administrator of the enterprise may wish to ascertain that communication between a mobile communicator device 104 and network 102 does not comprise communication which is associated with malware.

It is appreciated that mobile devices 104 may include, for example, mobile telephones, smartphones, tablet computers, portable computers, wearable computing devices, head-mounted computer devices and smart watches. It is also appreciated that network gateway server 100 may reside on any of mobile devices 104.

Preferably, the system 110 of FIG. 1 includes security risk calculation functionality which communicates with each mobile communicator device 104 and which is operable for calculating a calculated malware-associated risk associated with mobile communicator device 104.

System 110 also preferably includes security risk responsive decision functionality, operating in response to the calculated malware-associated risk, for ascertaining whether to allow the communicating of mobile communicator device 104 with network 102 via computerized network gateway server 100. It is appreciated that system 110 may reside, for example, on mobile communicator device 104 or on a cloud server in the internet.

In accordance with a preferred embodiment of the present invention, security risk calculation functionality of system 110 preferably analyzes characteristics and behavior patterns of mobile communicator device 104 and communication patterns generated by mobile communicator device 104 in order to calculate the calculated malware-associated risk associated with mobile communicator device 104. When analyzing the characteristics, behavior patterns and communication patterns of mobile communicator device 104 security risk calculation functionality of system 110 preferably employs a plurality of rules which define known malware-associated behavior. It is appreciated that the rules may be periodically remotely updated on system 110 via, for example, the internet.

It is appreciated that the calculated malware-associated risk associated with mobile communicator device 104 corresponds to the likelihood of any of the characteristics, behavior patterns and communication patterns of mobile communicator device 104 being associated with malware. It is further appreciated that the likelihood of any of the characteristics, behavior patterns and communication patterns of a mobile communicator device 104 being associated with malware may vary between different ones of mobile communicator device 104.

It is a particular feature of a preferred embodiment of the present invention that responsive to calculating the calculated malware-associated risk and comparing the calculated malware-associated risk to a predetermined risk threshold, security risk responsive decision functionality of system 110 is operative to allow direct communicating of mobile communicator device 104 with network 102 via computerized network gateway server 100 when the calculated malware-associated risk is lower than the predetermined risk threshold, and to disallow direct communicating of mobile communicator device 104 with network 102 via computerized network gateway server 100 when the calculated malware-associated risk is higher than the predetermined risk threshold.

It is appreciated that security risk calculation functionality of system 110 is operative to continuously calculate the calculated malware-associated risk associated with mobile communicator device 104. Therefore, in a case where security risk responsive decision functionality of system 110 disallows direct communicating of mobile communicator device 104 with network 102 via computerized network gateway server 100 responsive to a calculated malware-associated risk which is higher than the predetermined risk threshold, security risk calculation functionality of system 110 may subsequently calculate a calculated malware-associated risk which is lower than the predetermined risk threshold, and responsive thereto security risk responsive decision functionality of system 110 may again allow direct communicating of mobile communicator device 104 with network 102 via computerized network gateway server 100.

The aforementioned analysis by security risk calculation functionality of system 110 of characteristics, behavior and communication patterns which are generated by mobile communicator device 104 preferably includes comparing at least one of the following events, behaviors and settings to events, behaviors and settings known to system 110 as being associated with malware. Such events, behaviors and settings may include any of the following:

events generated by an operating system of mobile communicator device 104;

network communication events generated by mobile communicator device 104;

network communication events generated by an application installed on mobile communicator device 104;

binary code of applications installed on mobile communicator device 104;

version identifiers of applications installed on mobile communicator device 104;

a version identifier of the operating system of mobile communicator device 104;

devices, documents and media files which are accessed on mobile communicator device 104;

the role of the owner of mobile communicator device 104 within an enterprise;

the location and roaming state of mobile communicator device 104;

the current type and state of the connection of mobile communicator device 104 to a wireless network, which may include, for example, secure/unsecure Wi-Fi, 3G, LTE and various encryption protocols;

files stored in the file system of mobile communicator device 104 or on an external storage device connected to mobile communicator device 104, which files may be malware associated;

the list of processes running on mobile communicator device 104 and characteristics associated therewith;

security settings of mobile communicator device 104 such as, for example, a setting which allows installation of third-party applications and security certificates;

debug settings of mobile communicator device 104 such as, for example, a directive to operate mobile communicator device 104 in a debug mode;

application metadata of applications installed on mobile communicator device 104;

application certificates of applications installed on mobile communicator device 104;

network settings of mobile communicator device 104 such as, for example, network parameters such as TCP and Wi-Fi related parameters; and software related parameters of mobile communicator device 104 such as build properties and driver parameters.

It is a particular feature of a preferred embodiment of the present invention that responsive to disallowing the communicating of mobile communicator device 104 with network 102 via computerized network gateway server 100, security risk responsive decision functionality of system 110 is operable for instructing mobile communicator device 104 to reroute communications originating from mobile communicator device 104 by employing any of the following mechanisms:

instructing mobile communicator device 104 to route network traffic to network 102 via a security enforcement server 120 using, for example, one of a VPN connection 122, a proxy connection 124 and an APN connection 126;

instructing mobile communicator device 104 to switch to an alternative vLAN of network gateway server 100 and only thereafter to route network traffic via computerized network gateway server 100; and modifying the routing tables of mobile communicator device 104 and only thereafter allowing mobile communicator device 104 to route network traffic via computerized network gateway server 100.

It is appreciated that the aforementioned rerouting of communications originating from mobile communicator device 104 may include rerouting either all communications originating from mobile communicator device 104 or a subset of communications originating therefrom. Such a subset may include, for example:

- any communication to particular domains or IP addresses which may be associated with malware;
- communications originating from particular applications installed on mobile communicator device 104;
- all communications originating from mobile communicator device 104 except for communications with particular IP addresses or domains; and
- specific types of application data communicated by mobile communicator device 104.

Figure 2:
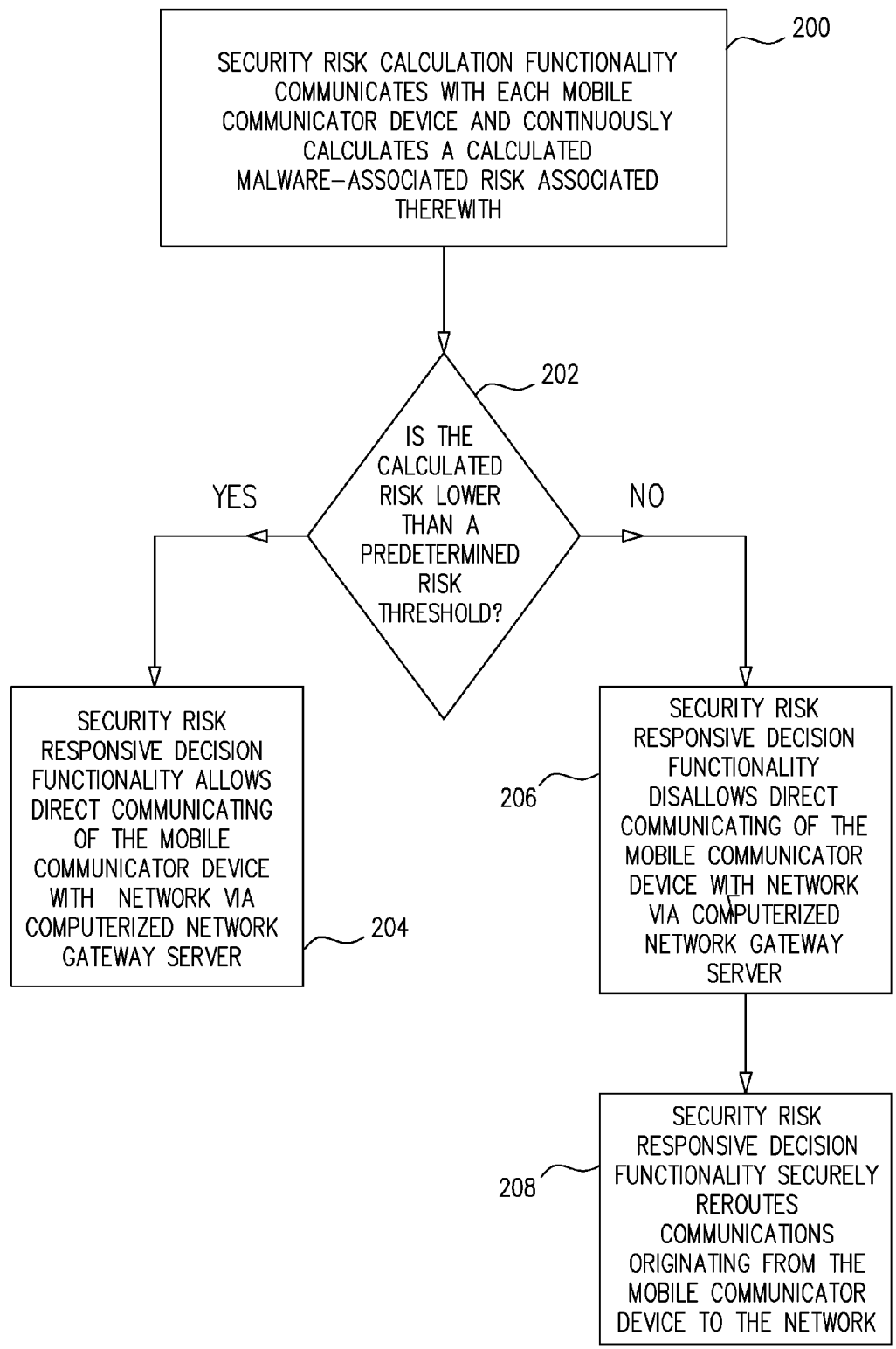
FIG. 2 is a simplified block diagram illustration of the mobile communicator network routing decision system of FIG. 1.

Reference is now made to FIG. 2, which is a simplified block diagram illustration of the mobile communicator network routing decision system of FIG. 1. As shown in FIG. 2, security risk calculation functionality of the mobile communicator network routing decision system of FIG. 1 preferably communicates with each of a plurality of mobile communicator devices and continuously calculates a calculated malware-associated risk associated with each of the mobile communicator devices (200).

As described hereinabove with reference to FIG. 1, the security risk calculation functionality preferably analyzes characteristics and behavior patterns of each of the mobile communicator devices as well as communication patterns generated thereby in order to calculate the calculated malware-associated risk associated with each of the mobile communicator devices. It is appreciated that the calculated malware-associated risk associated with a mobile communicator device typically corresponds to the likelihood of any of the characteristics, behavior patterns and communication patterns of the mobile communicator device being associated with malware.

As further shown in FIG. 2, responsive to calculating the calculated malware-associated risk associated with a mobile communicator device, the security risk responsive decision functionality compares the calculated risk to a predetermined risk threshold (202). In a case where the calculated risk is lower than the predetermined risk threshold, the security risk responsive decision functionality allows direct communicating of the mobile communicator device with a network via a computerized network gateway server (204). In a case where when the calculated risk is higher than the predetermined risk threshold, the security risk responsive decision functionality disallows direct communicating of the mobile communicator device with the network via the computerized network gateway server (206).

As described hereinabove with reference to FIG. 1, the aforementioned analysis by the security risk calculation functionality of characteristics, behavior and communication patterns which are generated by the mobile communicator device preferably includes comparing at least one of the following events, behaviors and settings to events, behaviors and settings to events, behaviors and settings known to the security risk calculation functionality as being associated with malware. Such events, behaviors and settings may include any of the following:

- events generated by an operating system of the mobile communicator device;
- network communication events generated by the mobile communicator device;
- network communication events generated by an application installed on the mobile communicator device;
- binary code of applications installed the mobile communicator device;
- version identifiers of applications installed on the mobile communicator device;
- a version identifier of the operating system of the mobile communicator device;
- devices, documents and media files which are accessed on the mobile communicator device;
- the role of the owner of the mobile communicator device within an enterprise;
- the location and roaming state of the mobile communicator device;
- the current type and state of the connection of the mobile communicator device to a wireless network, which may include, for example, secure/unsecure Wi-Fi, 3G, LTE and various encryption protocols;
- files stored in the file system of the mobile communicator device or on an external storage device connected to the mobile communicator device, which files may be malware associated;
- the list of processes running on the mobile communicator device and characteristics associated therewith;
- security settings of the mobile communicator device such as, for example, a setting which allows installation of third-party applications and security certificates;
- debug settings of the mobile communicator device such as, for example, a directive to operate mobile communicator device in a debug mode;
- application metadata of applications installed on the mobile communicator device;
- application certificates of applications installed on the mobile communicator device;
- network settings of the mobile communicator device such as, for example, network parameters such as TCP and Wi-Fi related parameters; and
- software related parameters of the mobile communicator device such as build properties and driver parameters.

As yet further shown in FIG. 2, responsive to disallowing direct communicating of the mobile communicator device with the network via the computerized network gateway server, the security risk responsive decision functionality securely instructs the mobile communicator device to reroute communications originating from the mobile communicator device to the network (208). It is appreciated that the rerouting of communications originating from the mobile communicator device to the network may be achieved by employing any of the following mechanisms:

- instructing the mobile communicator device to route network traffic to the network via a security enforcement server using, for example, one of a VPN connection, a proxy connection and an APN connection;
- instructing the mobile communicator device to switch to an alternative vLAN of the network gateway server and only thereafter to route network traffic via the computerized network gateway server; and
- modifying the routing tables of the mobile communicator device and only thereafter allowing the mobile communicator device to route network traffic via the computerized network gateway server.

It is appreciated that the aforementioned rerouting of communications originating from the mobile communicator device may include rerouting either all or a subset of the communications originating from the mobile communicator device. Such a subset may include, for example:

- any communication to particular domains or IP addresses which may be associated with malware;
- communications originating from particular applications installed on the mobile communicator device;

all communications originating from the mobile communicator device except for communications with particular IP addresses or domains; and specific types of application data communicated by the mobile communicator device.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A mobile communicator network routing decision system communicating with each mobile communicator device of a plurality of mobile communicator devices, said plurality of mobile communicator devices communicating with a network via at least one computerized network gateway server, said system comprising:

security risk calculation functionality operable for calculating a calculated malware-associated risk associated with each said mobile communicator device; and, security risk responsive decision functionality, operating in response to said calculated malware-associated risk, for:

ascertaining whether to allow said communicating of each said mobile communicator device with said network via said computerized network gateway server; and, comparing said calculated malware-associated risk to a predetermined risk threshold, and: 1) when said calculated malware-associated risk is below said predetermined risk threshold, allowing direct communicating of said mobile communicator device with said network via said computerized network gateway server; 2) when said calculated malware-associated risk is above said predetermined risk threshold, disallowing direct communicating of said mobile communicator device with said network via said computerized network gateway and rerouting said communicating of said mobile communicator device over an alternative pathway to said network.

2. A mobile communicator network routing decision system according to claim 1 and wherein said network is the internet.

3. A mobile communicator network routing decision system according to claim 1 and wherein said network gateway server is a GGSN gateway server.

4. A mobile communicator network routing decision system according to claim 1 and wherein said network gateway server is a Wi-Fi access point.

5. A mobile communicator network routing decision system according to claim 1 and wherein said network gateway server resides on any of said plurality of mobile communicator devices.

6. A mobile communicator network routing decision system according to claim 1 and wherein said system resides on at least one of said mobile communicator devices.

7. A mobile communicator network routing decision system according to claim 1 and wherein said system resides on a cloud server, said cloud server residing in the internet.

8. A mobile communicator network routing decision system according to claim 1 and wherein said calculating of a calculated malware-associated risk associated with a mobile communicator device, comprises analyzing characteristics and behavior patterns of said mobile communicator device and communication patterns generated by said mobile communicator device.

9. A mobile communicator network routing decision system according to claim 8 and wherein said analyzing characteristics and behavior patterns of said mobile communicator device and communication patterns generated by said mobile communicator device comprise employing a plurality of rides which define known malware-associated behavior.

10. A mobile communicator network routing decision system according to claim 9 and wherein said rules are periodically remotely updated on said system via the internet.

11. A mobile communicator network routing decision system according to claim 8 and wherein said calculated malware-associated risk associated with said mobile communicator device corresponds to a likelihood of at least some of said characteristics, said behavior patterns and said communication patterns of said mobile communicator device being associated with malware.

12. A mobile communicator network routing decision system according to claim 11 and wherein said likelihood of said at least some of said characteristics, said behavior patterns and said communication patterns being associated with malware varies between different ones of said mobile communicator devices.

13. A mobile communicator network routing decision system according to claim 8 and wherein said analyzing said characteristics, said behavior patterns and said communication patterns of said mobile communicator device comprises comparing at least one of:

events generated by an operating system of said mobile communicator device; network communication events generated by said mobile communicator device;

network communication events generated by an application installed on said mobile communicator device;

binary code of applications installed on said mobile communicator device; version identifiers of applications installed on said mobile communicator device;

a version identifier of an operating system of said mobile communicator device; devices, documents and media files which are accessed on said mobile communicator device;

a role of an owner of said mobile communicator device within an enterprise;

a location and a roaming state of said mobile communicator device; a current type and state of a connection of said mobile communicator device to a wireless network;

files stored on at least one of a file system of said mobile communicator device and an external storage device connected to said mobile communicator device;

a list of processes running on said mobile communicator device and characteristics associated therewith;

security settings of said mobile communicator device; debug settings of said mobile communicator device;

application metadata of applications installed on said mobile communicator device;

application certificates of applications installed on said mobile communicator device;

network settings of said mobile communicator device; and software related parameters of said mobile communicator device to corresponding behaviors and settings known to said system as being associated with malware.

14. A mobile communicator network routing decision system according to claim 13 and wherein said current type and state of a connection of said mobile communicator device to a wireless network comprises at least one of secure/unsecure WiFi. 3G (Third Generation) and LTE (Long Term Evolution).

15. A mobile communicator network routing decision system according to claim 13 and wherein said security settings of said mobile communicator device comprise at least a setting which allows installation of third-party applications and security certificates on said mobile communicator device.

16. A mobile communicator network routing decision system according to claim 13 and wherein said debug settings of said mobile communicator comprise at least a directive to operate said mobile communicator device in a debug mode.

17. A mobile communicator network routing decision system according to claim 13 and wherein said software related parameters of said mobile communicator device comprise at least one of a build property and a driver parameter.

18. A mobile communicator network routing decision system according to claim 13 and wherein said network settings of said mobile communicator device comprise at least network parameters, said network parameters comprising at least one of TCP (Transmission Control Protocol) and Wi-Fi related parameters.

19. A mobile communicator network routing decision system according to claim 1 and wherein said security risk calculation functionality is operative to continuously calculate said calculated malware-associated risk associated said mobile communicator device.

20. A mobile communicator network routing decision system according to claim 19 and wherein when said security risk responsive decision functionality disallows direct communicating of said mobile communicator device with said network via said computerized network gateway server responsive to a first calculated malware-associated risk which is higher than said predetermined risk threshold, said security risk calculation functionality is then subsequently operable to calculate a second calculated malware-associated risk which is lower than said predetermined risk threshold, and responsive thereto, said security risk responsive decision functionality is operable to reallow direct communicating of said mobile communicator device with said network via said computerized network gateway server.

21. A mobile communicator network routing decision system according to claim 1 and wherein said allowing said direct communicating of said mobile communicator device with said network via said computerized network gateway server comprises instructing said mobile communicator device to route network traffic to said network via said computerized network gateway server.

22. A mobile communicator network routing decision system according to claim 1 and wherein said disallowing said direct communicating of said mobile communicator device with said network via said computerized network gateway server comprises instructing said mobile communicator device to cease routing network traffic to said network via said computerized network gateway server.

23. A mobile communicator network routing decision system according to claim 1 and wherein said alternate pathway includes routing through a security enforcement server by employing at least one of a VPN (Virtual Private Network) connection, a proxy connection, and an APN (Access Point Name) connection.

24. A mobile communicator network routing decision system according to claim 1 and wherein said disallowing said direct communicating of said mobile communicator device with said network via said computerized network gateway server comprises instructing said mobile communicator device to switch to said alternative pathway includes a vLAN (virtual Local Area Network) of said network gateway server and said computerized network gateway server.

25. A mobile communicator network routing decision system according to claim 1 and wherein said disallowing said direct communicating of said mobile communicator device with said network via said computerized network gateway server comprises modifying routing tables of said mobile communicator device and said alternative pathway includes routing via said computerized network gateway server.

26. A mobile communicator network routing decision system according to claim 1 and wherein said ascertaining whether to allow said communicating of said mobile communicator device with said network via said computerized network gateway server comprises ascertaining whether to allow a subset of said communicating of said mobile communicator device with said network via said computerized network gateway.

27. A mobile communicator network routing decision system according to claim 26 and wherein said subset of said communicating of said mobile communicator device with said network via said computerized network gateway comprises at least one of:
  communication of said mobile communicator device to particular domains or IP addresses which are associated with malware;
  communications of said mobile communicator originating from particular applications installed on said mobile communicator device;
  all communications originating from said mobile communicator device except for communications with particular IP addresses or domains; and
  specific types of application data communicated by said mobile communicator device.

28. A mobile communicator network routing decision method comprising:
  calculating a malware-associated risk associated with a mobile communicator device;
  responsive to said calculated malware-associated risk, ascertaining whether to allow communicating of said mobile communicator device with a network via a computerized network gateway server by comparing said calculated malware-associated risk to a predetermined risk threshold, and:
  1) when said calculated malware-associated risk is below said predetermined risk threshold, allowing direct communicating of said mobile communicator device with said network via said computerized network gateway server; and,
  2) when said calculated malware-associated risk is above said predetermined risk threshold, disallowing direct communicating of said mobile communicator device with said network via said computerized network gateway and rerouting said communicating of said mobile communicator device over an alternative pathway to said network.

29. A mobile communicator network routing decision method according to claim 28 and wherein said network is the internet.

30. A mobile communicator network routing decision method according to claim 28 and wherein said network gateway server is a GGSN gateway server.

31. A mobile communicator network routing decision method according to claim 28 and wherein said network gateway server is a Wi-Fi access point.

32. A mobile communicator network routing decision method according to claim 28 and wherein said network gateway server resides on said mobile communicator device.

33. A mobile communicator network routing decision method according to claim 28 and wherein said calculating of a calculated malware-associated risk associated with a mobile communicator device comprises analyzing characteristics and behavior patterns of said mobile communicator device and communication patterns generated by said mobile communicator device.

34. A mobile communicator network routing decision method according to claim 33 and wherein said analyzing characteristics and behavior patterns of said mobile communicator device and communication patterns generated by said mobile communicator device comprise employing a plurality of rules which define known malware-associated behavior.

35. A mobile communicator network routing decision method according to claim 34 and wherein said rules are periodically remotely updated via the internet.

36. A mobile communicator network routing decision method according to claim 33 and wherein said calculated malware-associated risk associated with said mobile communicator device corresponds to a likelihood of at least some of said characteristics, said behavior patterns and said communication patterns of said mobile communicator device being associated with malware.

37. A mobile communicator network routing decision method according to claim 36 and wherein said likelihood of said at least some of said characteristics, said behavior patterns and said communication patterns being associated with malware varies between different ones of said mobile communicator devices.

38. A mobile communicator network routing decision method according to claim 33 and wherein said analyzing said characteristics, said behavior patterns and said communication patterns of said mobile communicator device comprises comparing, at least one of:
  events generated by an operating system of said mobile communicator device; network communication events generated by said mobile communicator device;
  network communication events generated by an application installed on said mobile communicator device;
  binary code of applications installed on said mobile communicator device; version identifiers of applications installed on said mobile communicator device;
  a version identifier of an operating system of said mobile communicator device;
  devices, documents and media files which are accessed on said mobile communicator device;
  a role of an owner of said mobile communicator device within an enterprise; a location and a roaming state of said mobile communicator device;
  a current type and state of a connection of said mobile communicator device to a wireless network;
  files stored on at least one of a file system of said mobile communicator device and an external storage device connected to said mobile communicator device;
  a list of processes running on said mobile communicator device and characteristics associated therewith;
  security settings of said mobile communicator device; debug settings of said mobile communicator device;
  application metadata of applications installed on said mobile communicator device;
  application certificates of applications installed on said mobile communicator device;
  network settings of said mobile communicator device; and
  software related parameters of said mobile communicator device to corresponding behaviors and settings known to be associated with malware.

39. A mobile communicator network routing decision method according to claim 38 and wherein said current type and state of a connection of said mobile communicator device to a wireless network comprises at least one of secure/unsecure Wi-Fi, 3G (ThirdGeneration) and LTE (Long Term Evolution).

40. A mobile communicator network routing decision method according to claim 38 and wherein said security settings of said mobile communicator device comprise at least a setting which allows installation of third-party applications and security certificates on said mobile communicator device.

41. A mobile communicator network routing decision method according to claim 38 and wherein said debug settings of said mobile communicator comprise at least a directive to operate said mobile communicator device in a debug mode.

42. A mobile communicator network routing decision method according to claim 38 and wherein said software related parameters of said mobile communicator device comprise at least one of a build property and a driver parameter.

43. A mobile communicator network routing decision method according to claim 38 and wherein said network settings of said mobile communicator device comprise at least network parameters, said network parameters comprising at least one of TCP (Transmission Control Protocol) and Wi-Fi related parameters.

44. A mobile communicator network routing decision method according to claim 28 and also comprising continuously calculating said calculated malware-associated risk associated said mobile communicator device.

45. A mobile communicator network routing decision method according to claim 44 and also comprising, responsive to initially disallowing direct communicating of said mobile communicator device with said network via said computerized network gateway server responsive to calculating a first calculated malware-associated risk which is higher than said predetermined risk threshold and then subsequently calculating a second calculated malware-associated risk which is lower than said predetermined risk threshold, reallowing direct communicating of said mobile communicator device with said network via said computerized network gateway server.

46. A mobile communicator network routing decision method according to claim 28 and wherein said allowing said direct communicating of said mobile communicator device with said network via said computerized network gateway server comprises instructing said mobile communicator device to route network traffic to said network via said computerized network gateway server.

47. A mobile communicator network routing decision method according to claim 28 and wherein said disallowing said direct communicating of said mobile communicator device with said network via said computerized network gateway server comprises instructing said mobile communicator device to cease routing network traffic to said network via said computerized network gateway server.

48. A mobile communicator network routing decision method according to claim 28 and wherein said disallowing said direct communicating of said mobile communicator device with said network via said computerized network gateway server comprises said rerouting over said alternative pathway by instructing said mobile communicator device to route network traffic to said network via a security enforcement server by employing at least one of a VPN (Virtual Private Network) connection, a proxy connection, and an APN (Access Point Name) connection.

49. A mobile communicator network routing decision method according to claim 28 and wherein said disallowing said direct communicating of said mobile communicator device with said network via said computerized network gateway server comprises said rerouting over said alternative pathway by instructing said mobile communicator device to switch to an alternative vLAN (virtual Local Area Network) of said network gateway server and only thereafter to route network traffic via said computerized network gateway server.

50. A mobile communicator network routing decision method according to claim 28 and wherein said disallowing said direct communicating of said mobile communicator device with said network via said computerized network gateway server comprises said rerouting over said alternative pathway by modifying routing tables of said mobile communicator device and only thereafter allowing said mobile communicator device to route network traffic via said computerized network gateway server.

51. A mobile communicator network routing decision method according to claim 28 and wherein said ascertaining whether to allow said communicating of said mobile communicator device with said network via said computerized network gateway server comprises ascertaining whether to allow a subset of said communicating of said mobile communicator device with said network via said computerized network gateway.

52. A mobile communicator network routing decision method according to claim 51 and wherein said subset of said communicating of said mobile communicator device with said network via said computerized network gateway comprises at least one of:

communication of said mobile communicator device to particular domains or IP addresses which are associated with malware;

communications of said mobile communicator originating from particular applications installed on said mobile communicator device;

all communications originating from said mobile communicator device except for communications with particular IP addresses or domains; and specific types of application data communicated by said mobile communicator device.

53. A computer usable non-transitory storage medium having a computer program embodied thereon for causing a suitable programmed system to render a routing decision, by performing the following steps when such program is executed on the system, the steps comprising:

calculating a malware-associated risk associated with a mobile communicator device; and, responsive to said calculated malware-associated risk, ascertaining whether to allow communicating of said mobile communicator device with a network via a computerized network gateway server by comparing said calculated malware-associated risk to a predetermined risk threshold, and:

1) when said calculated malware-associated risk is below said predetermined risk threshold, allowing direct communicating of said mobile communicator device with said network via said computerized network gateway server; and, 2) when said calculated malware-associated risk is above said predetermined risk threshold, disallowing direct communicating of said mobile communicator device with said network via said computerized network gateway and rerouting said communicating of said mobile communicator device over an alternative pathway to said network.

54. The computer usable non-transitory storage medium of claim 53 configured for running on a mobile communicator device.

55. The computer usable non-transitory storage medium of claim 53 configured for running on a server.

* * * * *